United States Patent
Lee et al.

(10) Patent No.: US 9,293,989 B2
(45) Date of Patent: Mar. 22, 2016

(54) DC TO DC BUCK CONVERTING CONTROLLER WITH PROGRAMMABLE ON-TIME PERIOD UNIT

(71) Applicant: GREEN SOLUTION TECHNOLOGY CO., LTD., New Taipei (TW)

(72) Inventors: Li-Min Lee, New Taipei (TW); Chung-Che Yu, New Taipei (TW); Shian-Sung Shiu, New Taipei (TW); Chao Shao, Wuxi (CN); Quan Gan, Wuxi (CN)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/109,964

(22) Filed: Dec. 18, 2013

(65) Prior Publication Data

US 2014/0103896 A1     Apr. 17, 2014

Related U.S. Application Data

(63) Continuation-in-part of application No. 13/284,974, filed on Oct. 30, 2011, now abandoned.

(30) Foreign Application Priority Data

Apr. 21, 2011 (CN) .......................... 2011 1 0100828

(51) Int. Cl.
*H02M 3/156* (2006.01)
*H02M 3/158* (2006.01)
*H02M 1/00* (2007.01)

(52) U.S. Cl.
CPC .............. *H02M 3/156* (2013.01); *H02M 3/158* (2013.01); *H02M 3/1588* (2013.01); *H02M 2001/0022* (2013.01); *H02M 2001/0025* (2013.01); *Y02B 70/1466* (2013.01)

(58) Field of Classification Search
CPC .......... H02M 1/44; H02M 2001/0022; H02M 2001/0025; H02M 2001/322
USPC .......... 323/222–225, 271–277, 282–290, 293, 323/298, 351–354
See application file for complete search history.

(56) References Cited

U.S. PATENT DOCUMENTS

| 5,631,675 A * | 5/1997 | Futagawa ..................... 347/10 |
| 6,198,265 B1 * | 3/2001 | Stevenson .................... 323/288 |

(Continued)

FOREIGN PATENT DOCUMENTS

| CN | 101542882 | 9/2009 |
| CN | 101566859 | 10/2009 |

(Continued)

OTHER PUBLICATIONS

"Office Action of China Counterpart Application", issued on Mar. 3, 2014, p. 1-p. 8.

(Continued)

*Primary Examiner* — Timothy J Dole
*Assistant Examiner* — Yusef Ahmed
(74) *Attorney, Agent, or Firm* — Jianq Chyun IP Office

(57) ABSTRACT

A programmable on-time period of a DC to DC buck converting controller is adjusted according to a level of a preset output voltage or a reference signal. Therefore, the DC to DC buck converting controller of the present invention is suitable for any applications with different requests of output voltages or different operating mode.

7 Claims, 5 Drawing Sheets

(56) References Cited

U.S. PATENT DOCUMENTS

| | | | |
|---|---|---|---|
| 6,828,836 B1* | 12/2004 | Barrow et al. | 327/172 |
| 7,259,603 B2* | 8/2007 | Gibson et al. | 327/170 |
| 7,388,444 B2* | 6/2008 | Liao | 331/143 |
| 7,425,819 B2* | 9/2008 | Isobe | 323/222 |
| 7,919,952 B1* | 4/2011 | Fahrenbruch | 323/222 |
| 8,217,637 B2* | 7/2012 | Tsui et al. | 323/282 |
| 8,334,682 B2* | 12/2012 | Chiu et al. | 323/282 |
| 8,487,603 B2* | 7/2013 | Kang | 323/313 |
| 8,717,002 B2* | 5/2014 | Xi | 323/285 |
| 2003/0001552 A1* | 1/2003 | Fujita et al. | 323/288 |
| 2003/0020437 A1* | 1/2003 | Kanamori | 323/222 |
| 2004/0257056 A1* | 12/2004 | Huang et al. | 323/282 |
| 2007/0210776 A1* | 9/2007 | Oka | 323/283 |
| 2008/0088284 A1* | 4/2008 | Weng | 323/271 |
| 2008/0088292 A1* | 4/2008 | Stoichita et al. | 323/285 |
| 2009/0218999 A1* | 9/2009 | Kikuchi | 323/282 |
| 2009/0261797 A1* | 10/2009 | Shibata | 323/288 |
| 2010/0148741 A1* | 6/2010 | Chen et al. | 323/285 |
| 2011/0199062 A1* | 8/2011 | Singnurkar | 323/282 |
| 2011/0215771 A1* | 9/2011 | Chang et al. | 320/166 |
| 2011/0215780 A1* | 9/2011 | Lee et al. | 323/282 |
| 2011/0267015 A1* | 11/2011 | Lu et al. | 323/235 |
| 2011/0273156 A1* | 11/2011 | Miyamae | 323/288 |
| 2011/0304308 A1* | 12/2011 | Wan et al. | 323/288 |
| 2012/0019218 A1* | 1/2012 | Fang et al. | 323/271 |
| 2012/0019219 A1* | 1/2012 | Fang et al. | 323/271 |
| 2012/0049829 A1* | 3/2012 | Murakami | 323/288 |
| 2012/0062196 A1* | 3/2012 | Chen et al. | 323/282 |
| 2012/0146606 A1* | 6/2012 | Li et al. | 323/283 |
| 2012/0274294 A1* | 11/2012 | Lee et al. | 323/282 |
| 2013/0009617 A1* | 1/2013 | Xi et al. | 323/271 |
| 2013/0038301 A1* | 2/2013 | Ouyang et al. | 323/271 |
| 2013/0063105 A1* | 3/2013 | Nishida et al. | 323/271 |
| 2013/0063107 A1* | 3/2013 | Nishida et al. | 323/271 |
| 2014/0084885 A1* | 3/2014 | Ouyang | 323/271 |
| 2014/0152274 A1* | 6/2014 | Lee et al. | 323/271 |
| 2014/0160601 A1* | 6/2014 | Ouyang | 361/18 |

FOREIGN PATENT DOCUMENTS

| | | |
|---|---|---|
| CN | 101630908 | 1/2010 |
| CN | 101753026 | 6/2010 |
| CN | 101783586 | 7/2010 |
| TW | I313958 | 8/2009 |
| TW | 201110523 | 3/2011 |

OTHER PUBLICATIONS

"Office Action of Chinese Counterpart Application", issued on Aug. 13, 2014, p. 1-p. 8.

"Office Action of Taiwan counterpart application" issued on Sep. 25, 2013, p. 1-p. 5.

"Office Action of U.S. Appl. No. 13/284,974" issued on Jun. 6, 2013, p. 1-p. 8.

* cited by examiner

DC TO DC BUCK CONVERTING CONTROLLER WITH PROGRAMMABLE ON-TIME PERIOD UNIT

CROSS-REFERENCE TO RELATED APPLICATION

This application is a continuation-in-part application of and claims the priority benefit of U.S. application Ser. No. 13/284,974, filed on Oct. 30, 2011, now pending, which claims the priority benefit of China application serial no. 201110100828.0, filed on Apr. 21, 2011. The entirety of each of the above-mentioned patent applications is hereby incorporated by reference herein and made a part of specification.

BACKGROUND OF THE INVENTION

1. Field of the Invention

The present invention relates to a DC to DC buck converting controller, and more particularly a DC to DC buck converting controller with programmable output voltage.

2. Description of Related Art

FIG. 1 is a schematic diagram of a conventional DC to DC buck converting circuit. The DC to DC buck converting circuit comprises a controller 10, two switches M1 and M2, an inductance L, a capacitance C, a bootstrap circuit BS and a voltage divider VD. The voltage divider VD detects an output voltage of the buck converting circuit and accordingly generates a feedback signal FB. The controller 10 turns the switches M1 and M2 on/off according to the feedback signal FB, so as to make the DC to DC buck converting circuit to convert an input signal Vin into an output voltage Vout which is stabilized at a preset output voltage, as well as provide an output current Iload.

The controller 10 is packaged in a package, and comprises a comparator 12, a on-time period circuit 14, and a logic circuit, which has a logic control circuit 16 and two gate driving units 18, 20. The comparator 12 generates a feedback control signal according to the feedback signal FB and a reference voltage Vref, which is generated inside the controller 10. An on-time period of the on-time period circuit 14 is determined by the input voltage Vin and the output voltage Vout, and the on-time period circuit 14 generates a constant on-time signal according to the feedback control signal. The logic control circuit 16 determines conduction timing and cut-off timing of the switches M1 and M2, and generates two control signals Sl and Su respectively via the gate driving units 18 and 20 to turn on and off the switches M1 and M2. The switch M2 is a N-type MOSFET. For avoiding that the gate driving unit 20 in the controller 10 cannot generate a signal which is high enough to turn on the switch M2. The bootstrap circuit BS is used to supply a sufficiently high voltage to the gate driving unit 20.

The constant on-time period circuit 14 adjusts the constant on-time period according to the input voltage Vin and the output voltage Vout to make the DC to DC buck converting circuit operate in a quasi-constant frequency. Therefore, an electromagnetic interference (EMI) generated by the switches M1 and M2 can be easily filtered out, regardless of the levels of the input voltage Vin and the output voltage Vout in different applications.

Compared with a conventional converting controller with error amplifier structure, the DC to DC buck converting controller with on-time structure has a better transient response. FIG. 2 shows waveform diagrams when a loading driven by the conventional converting circuit with on-time structure is changed. At a tome point t1, the output current Iload is raised while the loading increases. During the interval from the time point t1 to a time point t2, the output voltage Vout is temporarily decreased due to that an increased output power provided by the converting circuit is not enough. After the time point t2, the output voltage Vout starts to be elevated and then reaches the original voltage level at a time point t3. The constant on-time period circuit 14 determines the on-time period in response to the input voltage Vin and the output voltage Vout. However, the output voltage Vout is lower than the original voltage level during an interval from the time point t1 to the time point t3, and so the on-time periods of cycles within the interval are shorter, which is a great disadvantage for transient response.

SUMMARY OF THE INVENTION

The invention adjusts the programmable on-time period of a DC to DC buck converting controller according to a reference signal, so as to be suitable for any applications with different requests of output voltages or different operating mode, and enhance the transient response. Furthermore, the converting controller can omits a pin for obtaining the information of output voltage to lower the cost of the converting controller and a PCB board therefore.

To accomplish the aforementioned and other objects, an exemplary embodiment of the invention provides a DC to DC buck converting controller, which is packaged in a package and adapted to control a DC to DC buck converting circuit which converts an input voltage into an output voltage. The DC to DC buck converting controller comprises a feedback circuit and a driving circuit. The feedback circuit receives a reference signal through a pin of the package and generates a feedback control signal according to a reference signal representative of a reference voltage and a feedback signal representative of the output voltage. The driving circuit generates at least one control signal to control the DC to DC buck converting circuit according to the feedback control signal. The driving circuit comprises an on-time period circuit. The on-time period circuit sets an on-time period of the DC to DC buck converting circuit according to the level of the reference voltage.

It needs to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DESCRIPTION OF EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 3:
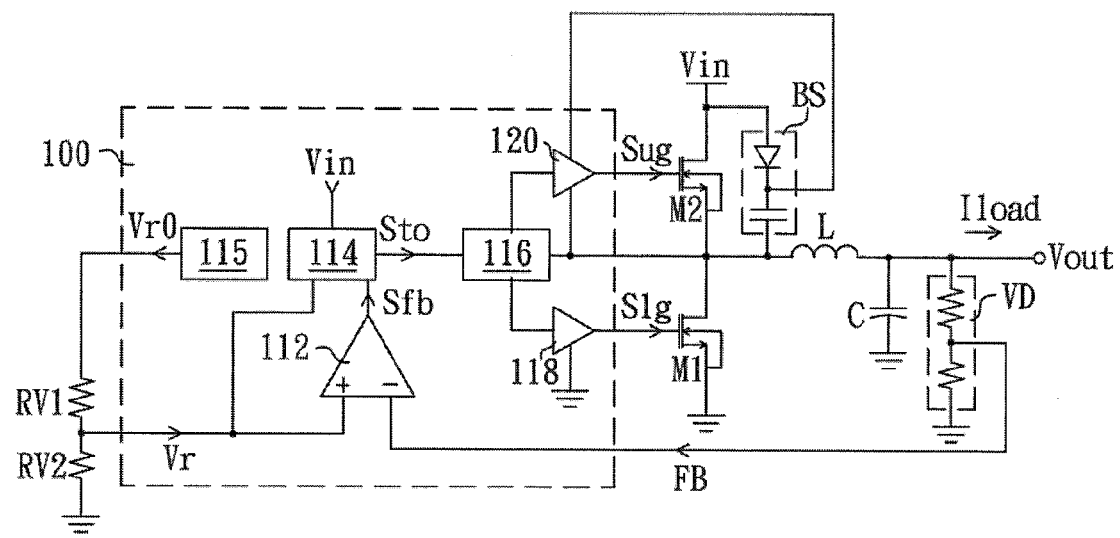
FIG. 3 is a schematic diagram of a DC to DC buck converting circuit according to a first embodiment of the invention.

FIG. 3 is a schematic diagram of a DC to DC buck converting circuit according to a first embodiment of the invention. The DC to DC buck converting circuit comprises a controller 100, two switches M1 and M2, an inductance L, a capacitance C, a bootstrap circuit BS and a voltage divider VD. The voltage divider VD detects an output voltage Vout of the DC to DC buck converting circuit and accordingly generates a feedback signal FB. The controller 100 turns the switches M1 and M2 on/off according to the feedback signal FB, so as to make the DC to DC buck converting circuit convert an input voltage Vin into an output voltage Vout which is stabilized at a preset output voltage and provide an output current Iload to a load (not shown).

The controller 100 comprises a feedback circuit 112, a driving circuit which comprises an on-time period circuit 114, a logic control circuit 116 and two gate driving units 118, 120, which is packaged in a package with a plurality of pins. The feedback circuit 112 comprises a comparator. An inverting input terminal of the comparator receives the feedback signal FB and a non-inverting input terminal thereof receives a reference voltage Vr and accordingly outputs a feedback control signal Sfb. The on-time period circuit 114 receives the feedback control signal Sfb and the reference voltage Vr and accordingly generates an on-time signal Sto. Therefore, the on-time period circuit 114 does not need the information of the output voltage Vout and can omit one pin for coupling to the output voltage Vout, which is used to get the information of the output voltage Vout in the conventional arts. A pulse width (time period) of the on-time signal Sto is determined by a voltage level of the reference voltage Vr. A starting timing of the on-time signal Sto, i.e., rising/falling edge, is determined according to the feedback control signal Sfb. The logic control circuit 116 is coupled with a connection node of the two switches M1 and M2 to detect a current of the inductance L and determine turned-on timings and turned-off timings of the two switches M1 and M2 according to the feedback control signal Sfb and the current of the inductance L. The logic control circuit 116 generates two control signals Slg and Sug respectively via the gate driving units 18 and 20 to turn the two switches M1 and M2 on/off. In the present embodiment, a duty cycle of the DC to DC buck converting circuit, i.e., a time ratio of a period time to transmit the power from the input voltage Vin into the DC to DC buck converting circuit via the switch M1 and a cycle time thereof, is determined by turned-on period of the switch M1. That is, when a beginning of each cycle (when the level of the feedback signal FB is lower than the level of the reference voltage Vr), the feedback circuit 112 generates a feedback control signal Sfb to make the on-time period circuit 114 to generate the on-time signal Sto with a pulse width (time period). The logic control circuit 116 turns on the switch M1 according to the on-time signal Sto. After the pulse width (time period), the logic control circuit 116 turns the switch M1 off and turns the switch M2 on to make the current of the inductance L freewheel through the switch M2. When the current of the inductance L is decreased to zero, the switch M2 is turned off.

The reference voltage Vr may be an external reference signal, input to the controller 100 through a pin of the package. The reference signal may be an analog signal having a reference voltage, or a digital signal indicative of the reference voltage. Therefore, a level of the reference voltage Vr is determined by an external circuit or set by users according to a preset output voltage. In the present embodiment, the controller 100 further comprises a reference voltage generating circuit 115. The reference voltage generating circuit 115 generates a reference base voltage Vr0. The user makes the reference base voltage Vr0 divided into a demand reference voltage Vr by a voltage divider and transmits the reference voltage Vr into the feedback circuit 112 and the on-time period circuit 114 through the pin. The voltage divider comprises the resistances RV1, RV2 and a voltage division ratio thereof is set by the input voltage Vin and the preset output voltage. In addition, the voltage division ratio of the voltage divider VD may affect the ratio of the feedback signal FB and the output voltage Vout. Therefore, the ratio of the resistances RV1, RV2 is set according to the voltage division ratio of the voltage divider VD.

Figure 4:
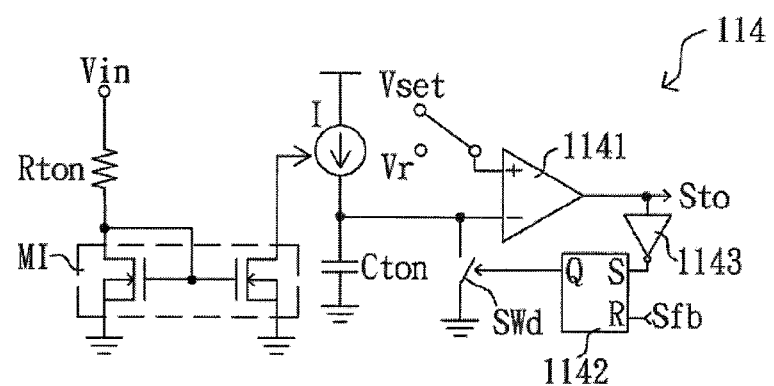
FIG. 4 is a schematic diagram of an on-time period circuit according to an embodiment of the invention.

FIG. 4 is a schematic diagram of an on-time period circuit according to an embodiment of the invention. The on-time period circuit 114 comprises a current source I, a period capacitance Cton and a comparator 1141. The current of the current source I is set by a current minor MI and an on-time period resistance Rton. The on-time period resistance Rton is coupled with the input voltage Vin and so a current flowing through the on-time period resistance depends on the input voltage Vin. The current flowing through the on-time period resistance is mirrored to the current source I by the current minor MI. On the beginning of each cycle, the period capacitance Cton is charging from zero by the current source I. The comparator 1141 compares the voltage of the period capacitance Cton with one of the original voltage Vset and the reference voltage Vr to generate the on-time signal Sto, and the original voltage Vset is higher than the reference voltage Vr. On the beginning of enabling the circuit, the comparator 1141 compares the voltage of the period capacitance Cton with the original voltage Vset to make the on-time period longer and so the output voltage Vout could be increased faster. Just before or when the output voltage Vout reaches the preset voltage, the comparator 1141 compares the voltage of the period capacitance Cton with the reference voltage Vr to make the output voltage Vout to be stabilized on the preset output voltage. The on-time period circuit 114 further comprises a SR flip-flop 1142 and an inverter 1143. A set terminal S of the SR flip-flop 1142 is coupled with the output terminal of the comparator 1141 through the inverter 1143, a reset terminal R thereof is coupled with the feedback circuit 112 and an output terminal is coupled with the discharging unit SWd. The discharging unit SWd is coupled with two ends of the period capacitance Cton to discharge the period capacitance Cton according to the controlling of the SR flip-flop 1142. When the voltage of the period capacitance Cton is higher than the reference voltage Vr, the on-time signal Sto is changed into low level to trigger the SR flip-flop 1142 through the inverter 1143. Then, the discharging unit SWd discharges the period capacitance Cton. When the output voltage Vout is lower than the preset voltage, the feedback control signal Sfb is at high level and input to the reset terminal R of the SR flip-flop 1142 to make the SR flip-flop 1142 reset to stop the discharging unit SWD discharging. Therefore, on the beginning of each cycle, the output voltage Vout is lower than the preset output voltage and the period capacitance Cton is charged by the current sources I. When the voltage of period capacitance C is higher than the reference voltage Vr, the period capacitance Cton is discharged to zero voltage to wait for the next cycle.

Figure 1:
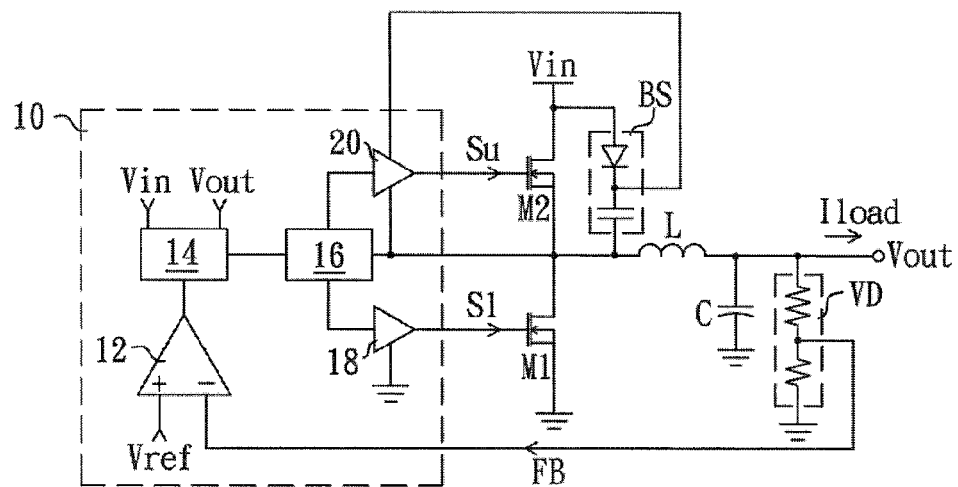
FIG. 1 is a schematic diagram of a conventional DC to DC buck converting circuit.
Figure 2:
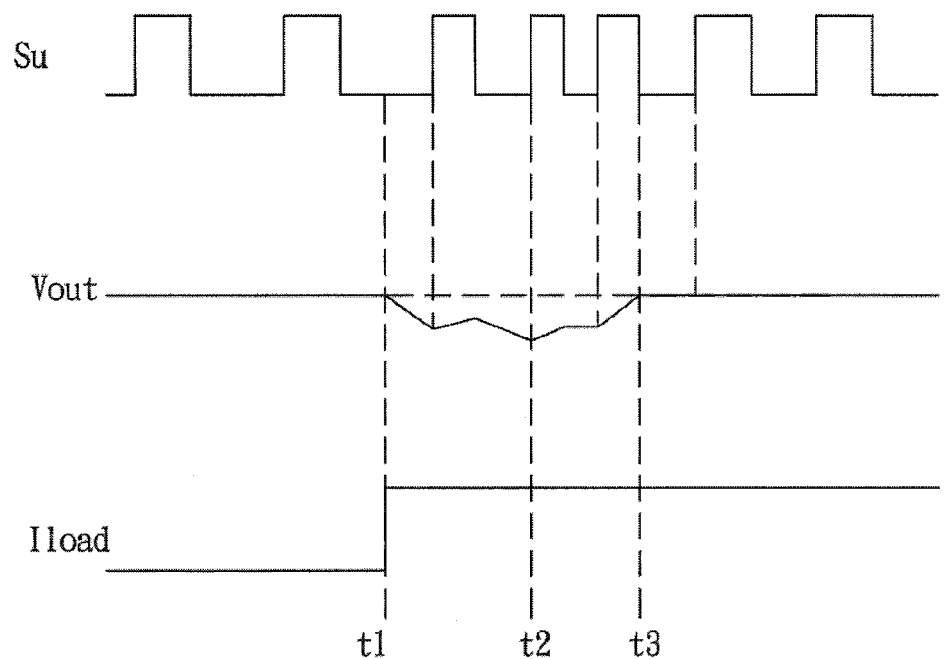
FIG. 2 shows waveform diagrams when a loading driven by the conventional converting circuit with on-time structure is changed.
Figure 5:
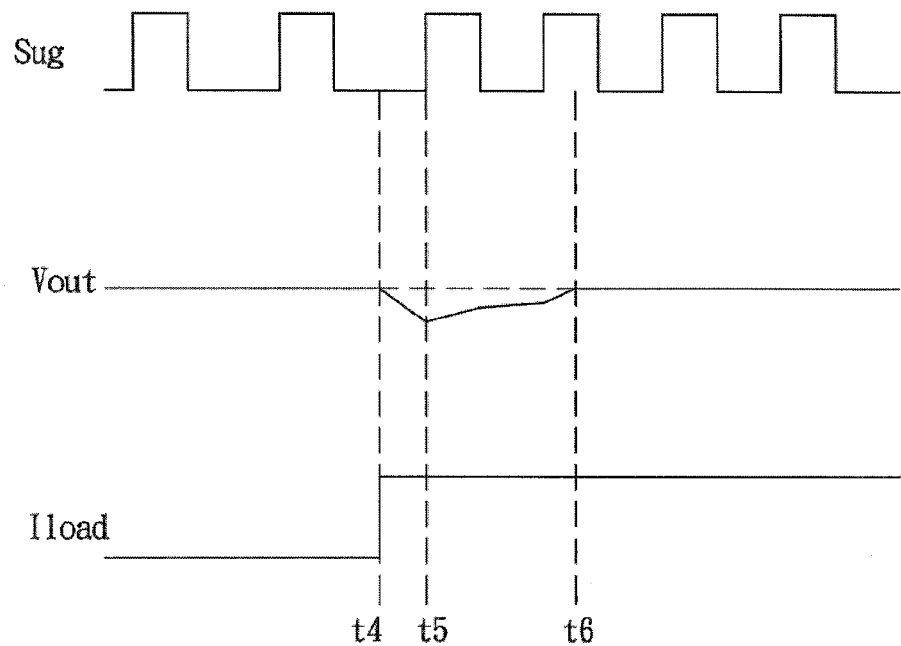
FIG. 5 shows waveform diagrams when a loading, driven by the DC to DC buck converting circuit shown in FIG. 3, is changed.

FIG. 5 shows waveform diagrams when a loading, driven by the DC to DC buck converting circuit shown in FIG. 3, is changed. At a tome point t4, the output current Iload is raised while the loading of the load increases. During the interval from the time point t4 to a time point t5, the output voltage Vout is temporarily decreased due to that an increased output power provided by the converting circuit is not enough. After the time point t5, the output voltage Vout starts to be elevated and then reaches the original voltage level at a time point t6. The on-time period circuit 114 determines the on-time period in response to the input voltage Vin and the reference voltage Vr regardless of the output voltage Vout. Due to that the reference voltage Vr is fixed regardless of the variation of the loading, the pulse width of the control signal Sug is fixed while the duty cycle thereof is increased. Therefore, the interval from the time point t4 to the time point t6 is shorter than that from time point tl to the time point t3 shown in FIG. 2, i.e.: the controller 100 has a better transient response than that of the conventional constant on-time converting controller.

Figure 6:
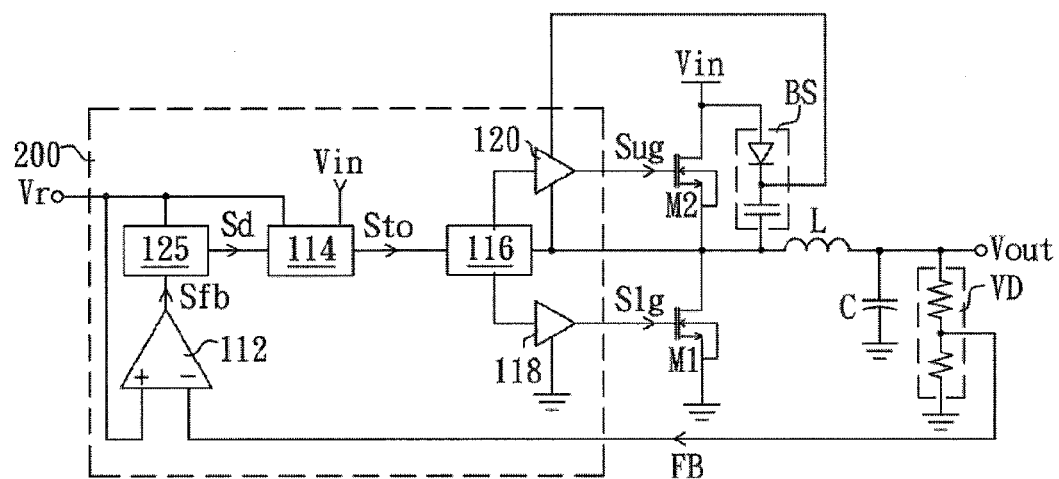
FIG. 6 is a schematic diagram of a DC to DC buck converting circuit according to a second embodiment of the invention.
Figure 7:
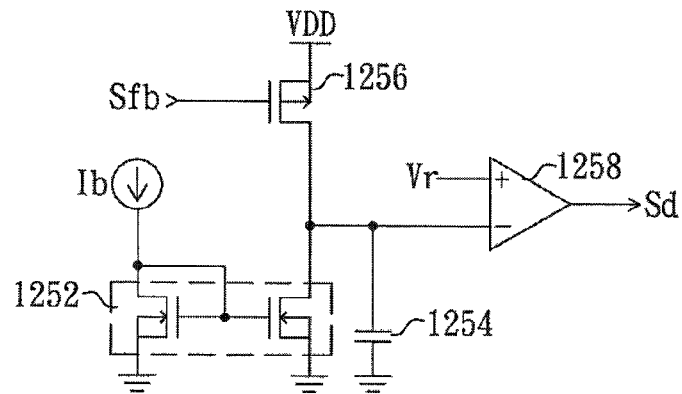
FIG. 7 is a schematic diagram of an anti-noise circuit according to an embodiment of the invention.

FIG. 6 is a schematic diagram of a DC to DC buck converting circuit according to a second embodiment of the invention. Compared with the embodiment shown in FIG. 3, the controller 200 omits the reference voltage generating circuit 115 and the voltage divider, and adds anti-noise circuit 125. The feedback circuit 112 directly receives the reference voltage Vr through a pin of the package and compares the reference voltage Vr with the feedback signal FB to generate the feedback control signal Sfb. If a digital reference signal indicative of the reference voltage is input through the pin, the controller 200 may adds a digital to analog converter to convert the digital signal into the reference voltage Vr. The anti-noise circuit 125 is coupled between the feedback circuit 112 and the on-time period circuit 114 for avoiding noise interferences in generation of the feedback control signal Sfb. The anti-noise circuit 125 generates a trigger signal Sd to the on-time period circuit 114 when the feedback control signal Sfb is generated for an anti-noise time. The anti-noise circuit 125 also receives the reference voltage Vr and modulates the anti-noise time in response to the reference voltage. FIG. 7 is a schematic diagram of an anti-noise circuit according to an embodiment of the invention. The anti-noise circuit comprises a bias current source Ib, a current mirror 1252, a delay capacitance 1254, a switch 1256, and a comparator 1258. A control terminal of the switch 1258 is coupled to an output end of the feedback circuit 112, and the switch 1256 is turned on and off according to the feedback control signal Sfb. The current mirror 1252 mirrors a current provided by the bias current source Ib to discharge the capacitance 1254. When the feedback signal FB is higher than the reference voltage Vr, the feedback control signal Sfb is at a low level. At this time, the switch 1256 is turned on to keep a voltage of the delay capacitance 1254 close to a supply voltage VDD higher than the reference voltage Vr, and so the comparator 1258 stops to generate the trigger signal Sd. When the feedback signal FB is lower than the reference voltage Vr, the feedback control signal Sfb is at a high level. At this time, the switch 1256 is turned off and so the current mirror 1252 starts to discharge the capacitance 1254. When the voltage of the capacitance 1254 is discharged to be lower than the reference voltage Vr, the comparator 1258 outputs the trigger signal Sd to the reset terminal R of the SR flip-flop 1142. At this moment, the on-time period circuit 114 starts to generate the on-time signal Sto. An anti-noise time is the time interval from the timing of generating the feedback control signal Sfb to the timing of generating the trigger signal Sd.

Figure 8:
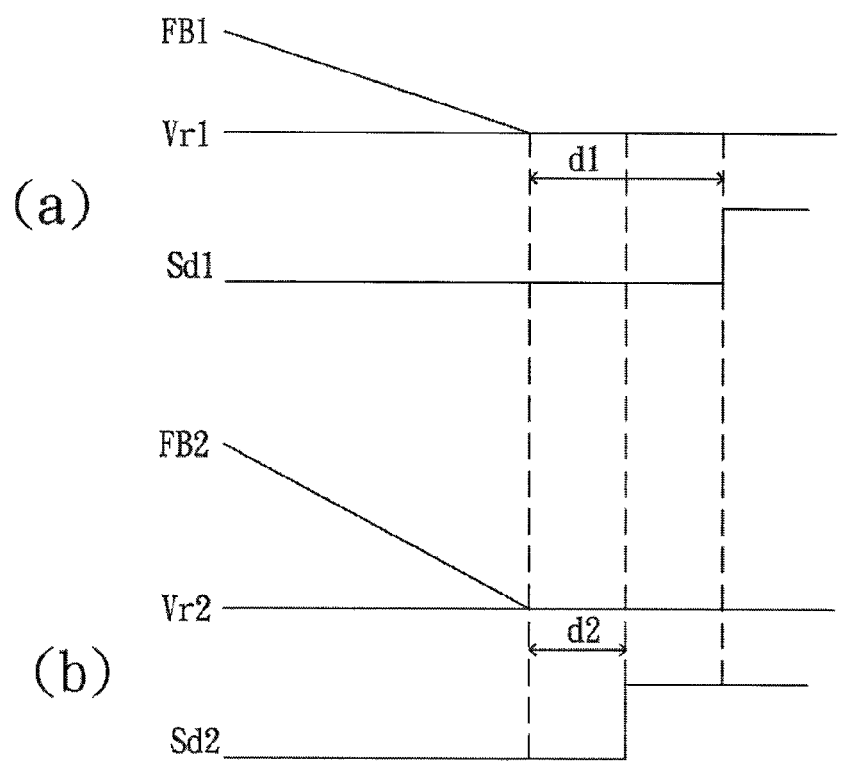
FIGS. 8(*a*) and (*b*) show waveform diagrams for difference reference voltages.

FIGS. 8(*a*) and (*b*) show waveform diagrams for difference reference voltages. A level of the reference voltage Vr represents the loading of the load as well as the preset output voltage. A reference voltage Vr1 of FIG. 8(*a*) is lower than a reference voltage Vr2 of FIG. 8(*b*). The anti-noise time is shortened when the reference voltage is increased, and alternatively the anti-noise time is lengthened when the reference voltage is lowered. Therefore, an anti-noise time d1 of FIG. 8(*a*) is longer than an anti-noise time d2 of FIG. 8(*b*). A ripple of the output voltage is increased with the increasing of the output voltage, and so an angle between the reference voltage Vr2 and the feedback signal FB2 is larger than that between the reference voltage Vr1 and the feedback signal FB1. Hence, when the preset output voltage is higher, the ripple of the output voltage is larger and a stability of the converting circuit is better but a transient response is poor. At this time, the anti-noise time of the anti-noise circuit of the invention is shortened to enhance the transient response. On the other hand, when the preset output voltage is lower, the ripple of the output voltage is smaller and the transient response of the converting circuit is better but the stability is poor. At this time, the anti-noise time of the anti-noise circuit of the invention is lengthened to enhance the stability.

Figure 9:
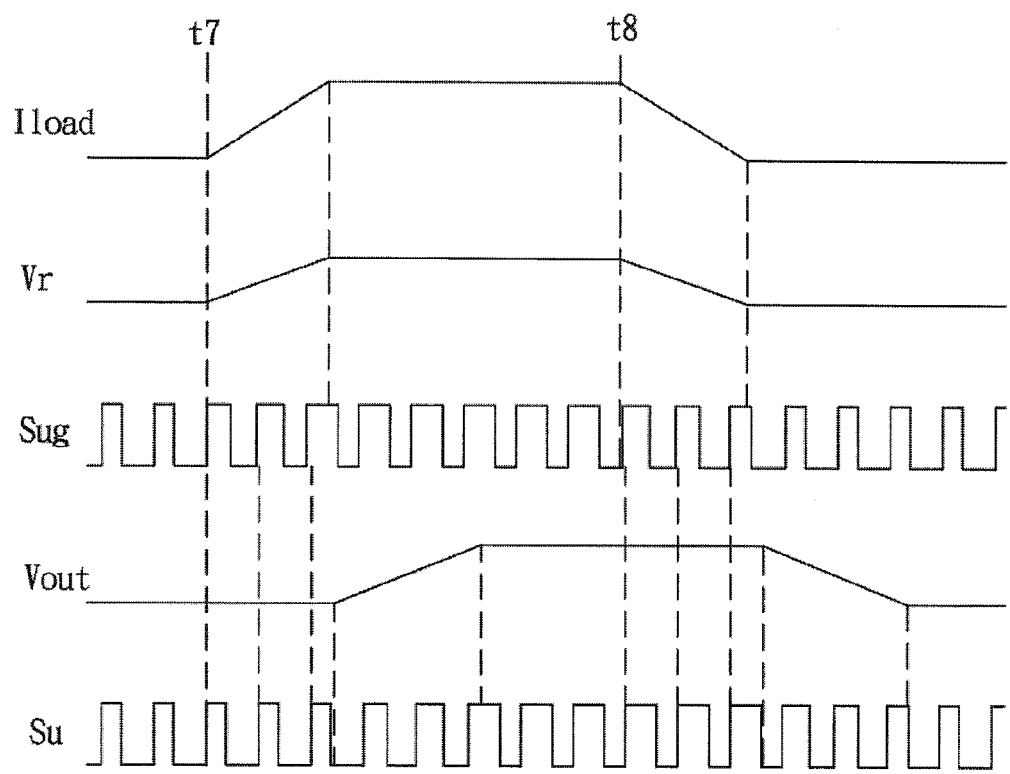
FIG. 9 shows waveform diagrams of control signals generated by the conventional converting controller and the converting controller of the invention.

FIG. 9 shows waveform diagrams of control signals generated by the conventional converting controller and the converting controller of the invention. The on-time period of the control signal Sug is determined according to the reference voltage Vr in the present invention. In contrast, the on-time period of the control signal Su is determined according to the output voltage Vout in the conventional arts. At a time point t7, the loading is increased and so the output current Iload and the reference voltage Vr are synchronously increased. The on-time period of the control signal Sug is increased with the increasing of the reference voltage Vr. However, the Vout is increased after, even temporarily reduced. The on-time period of the control signal Su is still retained. Moreover, the anti-noise time of the invention is shortened. The beginning of the control signal Sug is early than that of the control signal Su. Both the longer on-time period and the shorter anti-noise time, the invention significantly improves the transient response while the loading is increasing.

At a time point t8, the loading is reduced and so the output current Iload and the reference voltage Vr are synchronously decreased. The on-time period of the control signal Sug is reduced with the reducing of the reference voltage Vr. However, the Vout is decreased after, even temporarily increased. The on-time period of the control signal Su is still retained. Moreover, the anti-noise time of the invention is lengthened. The beginning of the control signal Sug is later than that of the control signal Su. Both the shorter on-time period and the longer anti-noise time, the invention simultaneously improves the transient response and the stability while the loading is reducing.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A DC to DC buck converting controller, packaged in a package and adapted to control a DC to DC buck converting circuit which converts an input voltage into an output voltage for driving a load, the DC to DC buck converting controller comprising:
    a feedback circuit, receiving a reference signal through a pin of the package and generating a feedback control signal according to the reference signal representative of a reference voltage and a feedback signal representative of the output voltage;
    a driving circuit, generating at least one control signal to control the DC to DC buck converting circuit according to the feedback control signal, and the driving circuit comprising an on-time period circuit which sets an on-time period of the DC to DC buck converting circuit according to a level of the reference voltage; and
    an anti-noise circuit coupled between the feedback circuit and the on-time period circuit, and the anti-noise circuit receives the reference signal and generates a trigger signal to the on-time period circuit when the feedback control signal is generated for an anti-noise time, which is modulated in response to the reference voltage, wherein when the level of the reference voltage is varied, the anti-noise time is accordingly adjusted,
    wherein the level of reference voltage is synchronously adjusted by the DC to DC buck converting controller with a loading of the load, the level of the reference voltage is increased while the loading is increased, such that the on-time period is lengthened, and the level of the reference voltage is decreased while the loading is decreased, such that the on-time period is shortened.

2. The DC to DC buck converting controller according to claim 1, wherein the on-time period circuit comprises a current source, a period capacitance and a comparator and the current source supplies a charging current to charge the period capacitance, and the current value of the charging current is set according to the input voltage and the comparator sets the on-time period according to a voltage of the period capacitance and the reference voltage.

3. The DC to DC buck converting controller according to claim 2, wherein the feedback circuit comprises a comparator which generates the feedback control signal according to the reference voltage and the feedback signal, and the on-time period circuit further comprises a discharging unit which determines a discharging timing of the period capacitance according to a comparison result of the comparator and the feedback control signal.

4. The DC to DC buck converting controller according to claim 1, wherein a generated timing of the trigger signal is later than that of the feedback control signal in response to the anti-noise time.

5. The DC to DC buck converting controller according to claim 1, further comprising a reference voltage generating circuit which generates a reference base voltage, wherein the reference signal is generated according to the reference base voltage by a voltage divider.

6. The DC to DC buck converting controller according to claim 1, wherein when the level of the reference voltage is increased, the anti-noise time is shortened, and when the level of the reference voltage is decreased, the anti-noise time is lengthened.

7. The DC to DC buck converting controller according to claim 1, wherein the anti-noise circuit comprises a delay capacitance and a comparator, the delay capacitance is charged and discharged in response to the feedback control signal and the comparator generates the trigger signal according to the reference voltage and a voltage of the delay capacitance.

* * * * *